United States Patent [19]

Nishikawa et al.

[11] Patent Number: 4,949,268
[45] Date of Patent: Aug. 14, 1990

[54] LAND VEHICLE NAVIGATION SYSTEM

[75] Inventors: Kunitoshi Nishikawa, Nagoya; Mitoshi Fujimoto, Aichi; Yoshikazu Asano, Owariasahi, all of Japan

[73] Assignee: Kabushiki Kaisha Toyota Chuo Kenkyusho, Aichi, Japan

[21] Appl. No.: 247,537

[22] Filed: Sep. 22, 1988

[30] Foreign Application Priority Data

Sep. 22, 1987 [JP] Japan .................. 62-236092

[51] Int. Cl.$^5$ .................. G01S 5/02; G01S 3/02; G06F 15/50
[52] U.S. Cl. .................. 364/449; 364/450; 340/995; 342/357; 342/457; 342/356
[58] Field of Search .............. 364/449, 450, 554, 575; 340/995; 342/357, 456, 356

[56] References Cited

U.S. PATENT DOCUMENTS

| 4,459,667 | 7/1984 | Takeuchi | 364/450 |
| 4,638,438 | 1/1987 | Endo et al. | 364/449 |
| 4,731,613 | 3/1988 | Endo et al. | 364/450 |

FOREIGN PATENT DOCUMENTS 61-198074 9/1986 Japan .

Primary Examiner—Parshotam S. Lall
Assistant Examiner—Michael Zanelli
Attorney, Agent, or Firm—Oblon, Spivak, McClelland, Maier & Neustadt

[57] ABSTRACT

A land vehicle navigation system is adapted to display the present position of a vehicle by receiving signals from a combination of satellites under the global positioning navigation system. The present position of the vehicle is displayed on a screen, superposed over map data. To obtain the best global positioning data, the combination of satellites is selected in connectio with the visibility. To perform the positive reception of signals from the satellites as the vehicle is running in an urban area, data relating to the building height around the area can be obtained from a geographical information section including data indicative of the map and the building height distribution with respect to the area to determine the visibility.

19 Claims, 12 Drawing Sheets

| | |
|---|---|
| 1 TRAVELLING DISTANCE | : 850 m |
| 2 NUMBER OF INTERSECTIONS | : 7 |
| 3 WIDTH OF MAIN ROAD | : 48 m |
| 4 WIDTH OF INTERSECTING ROAD | : 16 m |
| 5 DISTANCE FROM BUILDING | : 38 m |
| 6 ANTENNA HEIGHT | : 2.2 m |
| 7 AVERAGE BUILDING HEIGHT | : 23.7 m |
| 8 MINIMUM BUILDING HEIGHT | : 13 m |
| 9 $\phi$ | : 85 deg |
| 10 ELEVATION ANGLE COMPENSATING VALUE | : +6 deg |

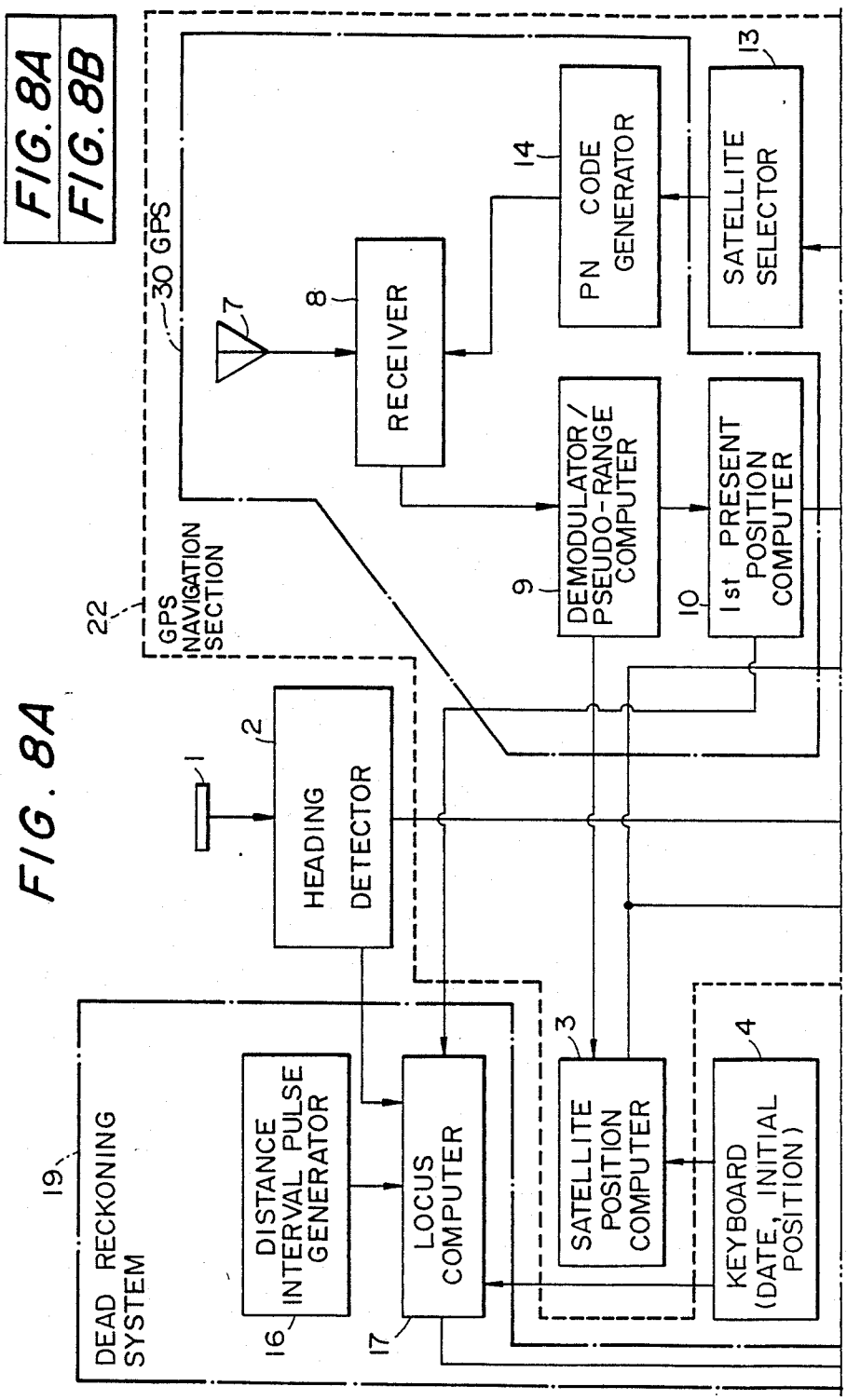

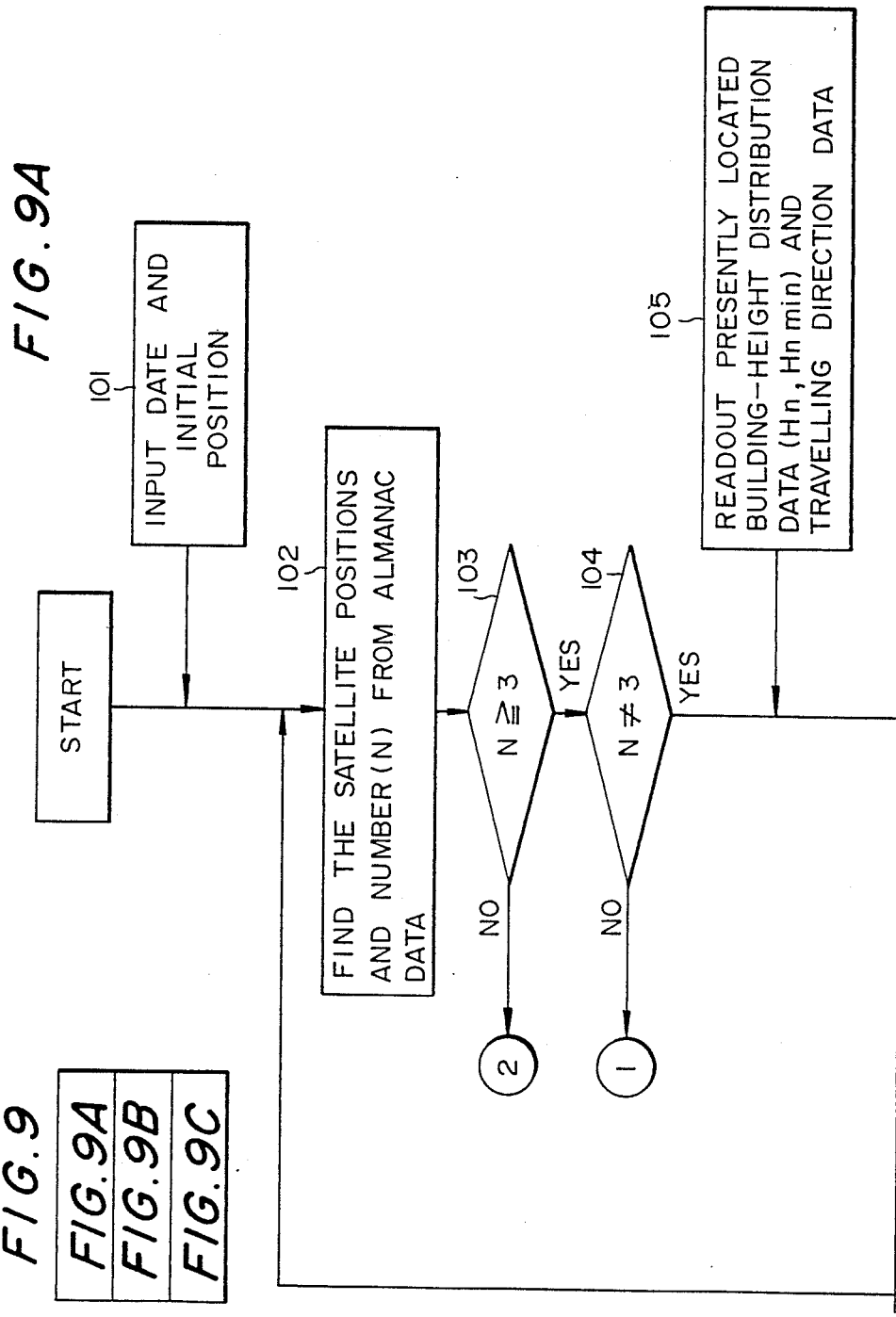

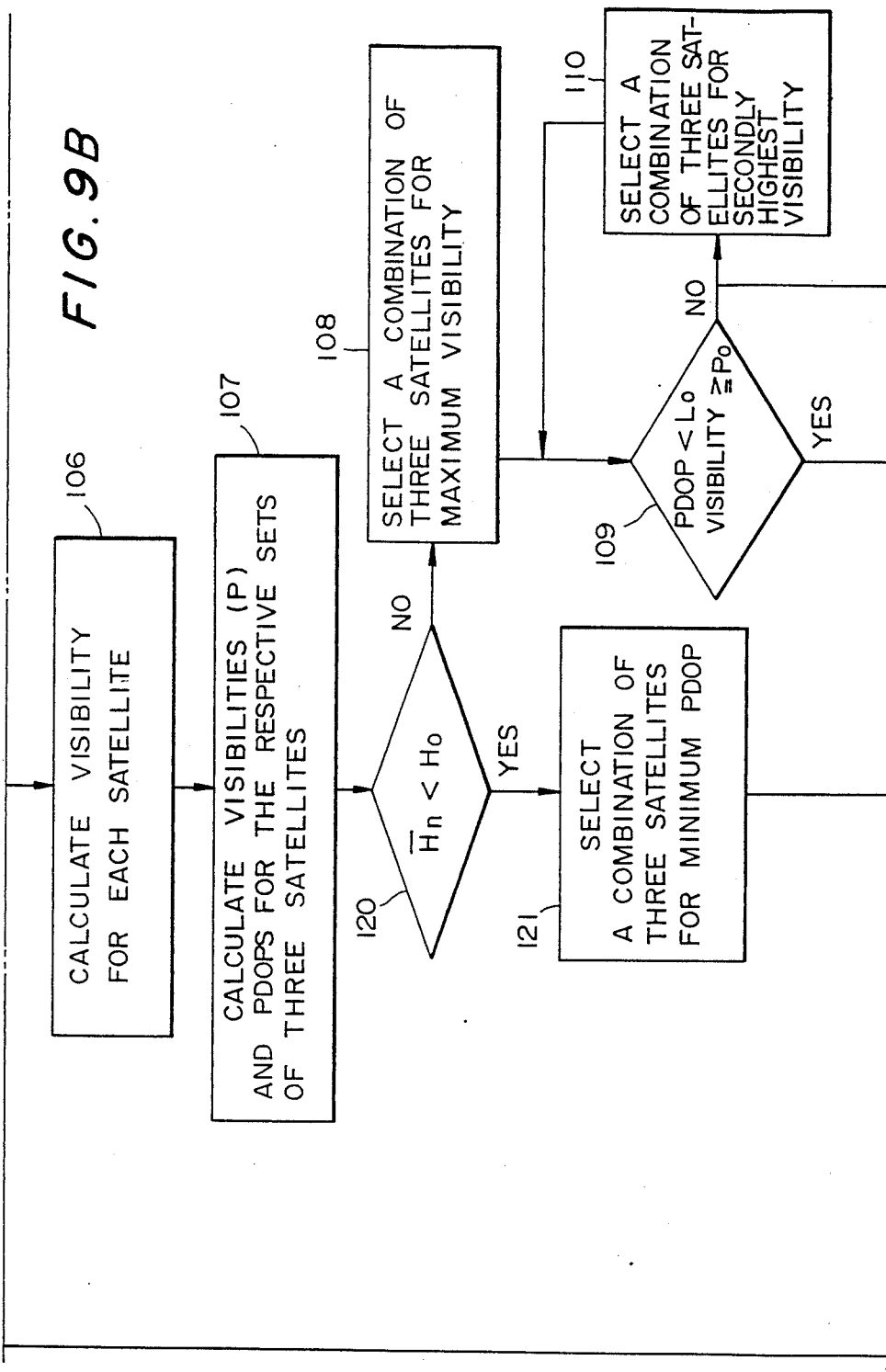

LAND VEHICLE NAVIGATION SYSTEM

BACKGROUND OF THE INVENTION

1. Field of the Invention:

The present invention relates to a land vehicle navigation system using a global positioning system (GPS). The land vehicle navigation system has the function that the optimum combination of GPS satellites (each hereinafter referred to "satellite" simply) can be selected to fixedly determine the present position of the vehicle in urban areas which include many buildings tending to block signals from satellites.

2. Description of the Prior Art:

The global positioning system can fixedly determine the present position of the vehicle by processing signals transmitted from preselected three or four satellites.

On selection of three or four satellites, the general method is to select such a combination of satellites that increases an accuracy of position determination as far as possible, that is, to select such a combination minimizing the position dilution of precision (PDOP) which represents radial range errors in the three-dimensional coordinates or the horizontal dilution of precision (HDOP) which represents radial range errors in the two-dimensional coordinates.

When a vehicle runs in an urban area or in a hilly country, the signals from satellites are frequently blocked by the buildings or mountains. Therefore, even if a combination of satellites is selected to minimize the PDOP or HDOP, the vehicle navigation system could be utilized only in very limited areas.

To improve the above problem, Japanese Laid-Open patent application 61-198074 has proposed to provide a memory section for storing map and terrain data with respect to an area in which the vehicle is to run. The memory section further stores necessary data for selecting the optimum combination of the satellite. For determinating which area the vehicle is running, the data includes suburban or urban indications on the map. The mountain height and position data is also available to exclude satellites from which signals might be blocked by the mountain when the vehicle is travelling in suburban area. For urban area driving, the data has to include the information (1) to select satellites having as much higher elevation angle as possible at the vehicle position user, (2) to select satellites each having its azimuth angle being coincident with the travelling direction of the vehicle or with the opposite direction thereof and (3) to exclude any satellite from which signals are frequently not received by ambiguous reason. However, the optimum satellite combination can not be always selected in accordance with the distribution of building height in the urban area using the above method.

SUMMARY OF THE INVENTION

It is therefore an object of the present invention to provide a land vehicle navigation system using GPS which can estimate the satellite visibility in an area wherein the position of the running vehicle is to be determined and which can also select such a combination of satellites to be higher visibilities.

To this end, the present invention provides a land vehicle navigation system comprising a geographical information section for storing the map of area in which the vehicle is to run and the distribution of building height in that area, a visibility computing section for predicting the satellite visibility, based on the distribution of building height from said geographical information section and satellite selecting section in response to the output of said visibility computing section for selecting a combination of satellites to be higher visibilities in that area.

In such an arrangement, the geographical information section previously stores the map of area in which the vehicle is to run and the distribution of building height in that area, for example, the average and minimum heights of building in each of the cells into which the area is divided. The visibility computing section is adapted to predict the satellite visibility based on the distribution of building height in the cell at which the vehicle is presently travelling. Finally, the satellite selecting section is adapted to select the combination of satellites by higher visibilities in that area, based on the output of the visibility computing section.

The present invention further provides a land vehicle navigation system comprising a geographical information section for storing the map of area in which the vehicle is to run and the distribution of building height, that is the average and minimum heights of building in each of the cells into which the area is divided, a visibility computing section for predicting the satellite visibility based on the distribution of building height from said geographical information section, a PDOP (or HDOP) computing section, and adopter for preferentially selecting the combination of satellites providing the minimum PDOP (or HDOP) or the combination of satellites by higher visibilities, based on the distribution of building height in the area at which the vehicle is travelling.

In such an arrangement, the geographical information section stores the distribution of building height, that is the average and minimum heights of building in each of the cells. The adopter preferentially selects the combination of satellites providing either of the minimum PDOP or high visibility, based on the data from the geographical information section representative of the average building height in the area in which the vehicle is presently travelling, whereby the optimum combination of satellites can be selected depending on the distribution of building height in that area.

In addition to use of the GPS, the present invention utilizes a dead reckoning system to fixedly determine the present position The present invention can obtain the data with respect to the present position of the vehicle from both the systems and then select the optimum data of position depending on the condition at that time to display the present position of the vehicle on the map and present position display section.

BRIEF DESCRIPTION OF THE DRAWINGS

FIGS. 8A and 8B are block diagrams of the second preferred embodiment of a land vehicle navigation system constructed according to the principle of the present invention, using the GPS and the dead reckoning system.

FIGS. 9A, 9B, and 9C are flow charts illustrating the operation of the navigation system in the second preferred embodiment of FIG. 8.

DETAILED DESCRIPTION OF THE PREFERRED EMBODIMENTS

Figure 1:
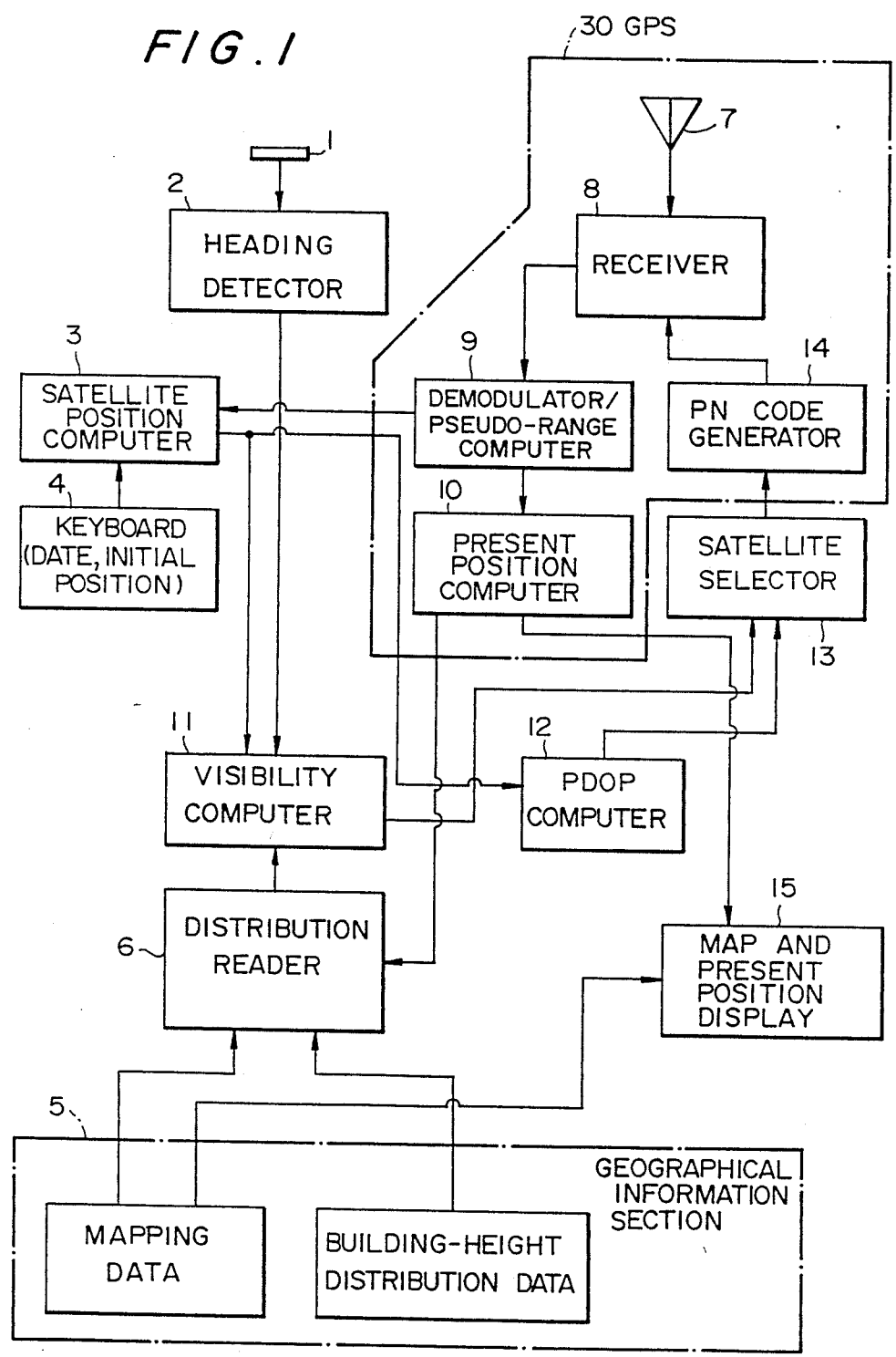
FIG. 1 is a block diagram of one preferred embodiment of a land vehicle navigation system constructed according to the principle of the present invention, showing the selection of a combination of satellites by higher visibilities.

The signal from GPS satellite is modulated by a pseudo noise code (PN code: a binary code consisting of "0" and "1" which appear randomly). Such modulation technique is called "spread spectrum". Though the above modulated signal is like white noise, this signal can be demodulated by multiplying it by a phase synchronized replica of the same PN code that the signal was modulated by. In the GPS, the PN code is primarily modulated by the data having the rate of 50 bps so as to transmit various data available at users, such as the status of the satellites, orbital data, time error in atomic clock in the satellite and other data. Such data are called "almanac data". Thus, the modulation by a PN code is called "secondary modulation". After the signal from the satellite has been demodulated by multiplying by a phase synchronized replica of the desired PN code, the data can be obtained by any suitable process such as coherent detection.

The present invention computes the visibility for each of the satellites and the PDOP to select the optimum combination of satellites providing the highest accuracy of position determination based on the map and the distribution of building height, the heading of the vehicle and azimuth and elevation angles of satellites. The signal from each of selected satellites is demodulated by multiplying by a phase synchronized replica of the PN code which corresponds to the selected satellite.

In the navigation using the GPS, the range between a satellite and the user must be needed for obtaining the user position. The range can be calculated by measuring the signal transmission time from the satellite to the user. Such measurement contains errors with respect to the clock offset of the receiver, and others. Thus, the measured range is called "pseudo-range". After a pseudo-range and data from the satellite have been obtained in the pseudo-range computing section, these data are transferred to the position computing section wherein the user position is computed in accordance with the following well-known equation.

$$Ri = Ri + C\Delta TAi + C(\Delta Tu + \Delta TSui)$$

where $Ri$ is a pseudo-range between the user and the satellite i; $Ri$ is a true range between the user and the satellite i; C is the speed of light; $\Delta TAi$ is the propagation delay in the ionosphere; $\Delta Tu$ is the user's clock offset from GPS time; and $\Delta TSui$ is the GPS satellite i clock offset from GPS time. $\Delta TSui$ and $\Delta TAi$ can be calculated from the data transmitted from the satellite.

Therefore, the above equation will contain four unknown factors, that is, the value of $\Delta Tu$ and the three-dimensional coordinates of the user's position. If the value of $Ri$ is measured respectively for four satellites, the three-dimensional position of the user can be determined. Alternatively, if one of three-dimensional factors relating to the height at the user is previously determined, the two-dimensional factors of the user's position can be determined simply by receiving signals from three satellites.

The user's position computed from the above equation is displayed at the map and present-position display section, superposed on a map indicative of an area in which the user's vehicle is travelling.

Means for computing the satellite visibility is particularly important for the present invention. The process of computing the satellite visibility will be first described briefly.

Figure 2:
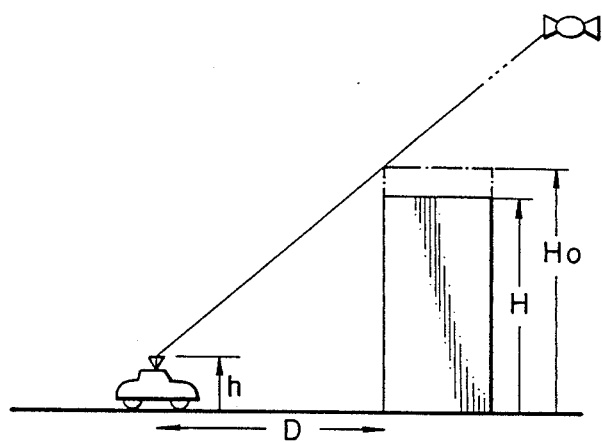
FIG. 2 is a schematic view showing a vehicle which is moving near the building blocking the signal from the satellite.

Considering the propagation between the satellite and the vehicle, it can be appreciated that the signal from the satellite can be received only in an area where direct waves can arrive (illuminated region). In an area where the signal is blocked by buildings (shadow region), the signal from the satellite can not be received except the boundary between the illuminated region and the shadow region. To simplify the calculation, it is assumed that the signal can be received only in the illuminated region. The satellite visibility will be equal to the probability under that the height of the building is lower than the height $H_0$ of the point at which the straight line connecting the vehicle and the satellite intersects the wall of that building as shown in FIG. 2.

From an investigation relating to the building height within the Tokyo area, it has been found that the distribution of building height is an exponential distribution in the area. See "Evaluation Method for Line-of-Sight Visibility and Radio Zone Design in Urban Areas" by OGAWA and SATO, Paper of Tech. Group on Antennas and Propagation, IECE Japan, AP82-57. It is regarded that this is the general tendency in urban areas. It also has been found that each of areas can be characterized by the average building height $\overline{H}$ and minimum building height Hmin in that area. Assuming that the height per floor is a constant, the cumulative distribution of building height B(H) that the building is higher than a height H can approximate to:

$$B(H) = exp\{-(H-Hmin)/(\overline{H}-Hmin)\} \quad (1)$$

Once the average and minimum heights of buildings in each of unit areas (for example, cells with some kilometers in radius or cities) have been investigated, the cumulative distribution of building height within a particular area can be estimated using the above equation.

Figure 3:
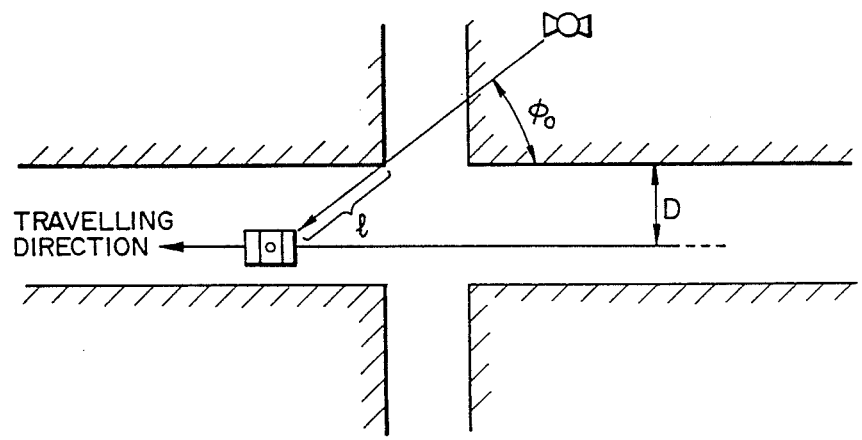
FIGS. 3A and 3B similarly illustrate a condition under which the signal from the satellite is blocked by buildings.
Figure 3:
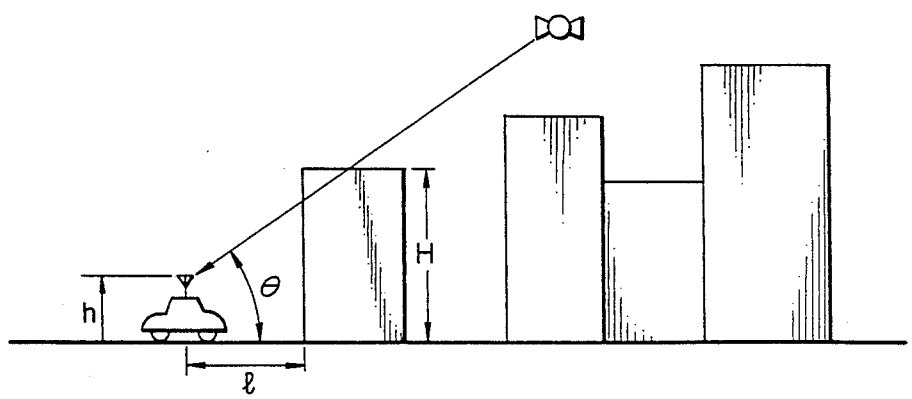

Now assume that the signal from the satellite is blocked only by buildings located along the road. FIGS. 3A and 3B show certain situations under which the satellite is visible at the position of the moving vehicle. Conveniently, the azimuth angle for the satellite from the travelling direction of the vehicle is represented by $\phi_0$ which can be determined by using an azimuth sensor. In FIG. 3, a distance l can be represented by:

$$l = D/\sin\phi_0$$

where D is a distance between the vehicle and the buildings. The height of a building which defines a boundary whether or not the satellite is visible at the antenna of the vehicle can be determined by:

$$H_0 = h + D \tan\theta/\sin\phi_0 \quad (2)$$

where h is the receiver antenna height and $\theta$ is the elevation angle for the satellite. The values of D and h can be determined previously.

Since the probability under which the building height is higher than $H_0$ can be represented by $B(H_0)$, the satellite visibility can approximate to:

$$P = 1 - B(H_0) \quad (3)$$

Based on the average and minimum heights ($\overline{H}$, Hmin) of buildings in each area stored in a geographical information section, the visibility of a satellite having an elevation angle $\theta$ and an azimuth angle $\phi_0$ from the travelling direction of the vehicle can be determined by the following equation:

$$P = 1 - \exp\{-(h + D \tan\theta/\sin\phi_0 - Hmin)/(\overline{H} - Hmin)\} \quad (4)$$

When the vehicle runs in or near an intersection of the road, the visibility may be influenced by the heights of buildings located along the intersecting roads. By considering this, the visibility can be determined more precisely. Actually, such a matter is substantially negligible since the width of the intersection is much shorter than the interval of the intersections of the road which the vehicle is to run.

Due to diffracted wave from the edge of the building, the signal from the satellite may be received even at a portion of the shadow region adjacent the boundary between the illuminated region and the shadow region. It is anticipated that the actual visibility is higher than the predicted level. Such a difference in visibility due to the diffracted wave may be compensated for, for example, by computing the visibility based on an elevation angle $(\theta + \Delta\theta)$ which is slightly larger than the actual elevation angle $\theta$. The angle $\Delta\theta$ is preferably ranged between 3 degrees and 8 degrees, depending on the sensitivity of the receiver or the value $\phi_0$.

Figure 4:
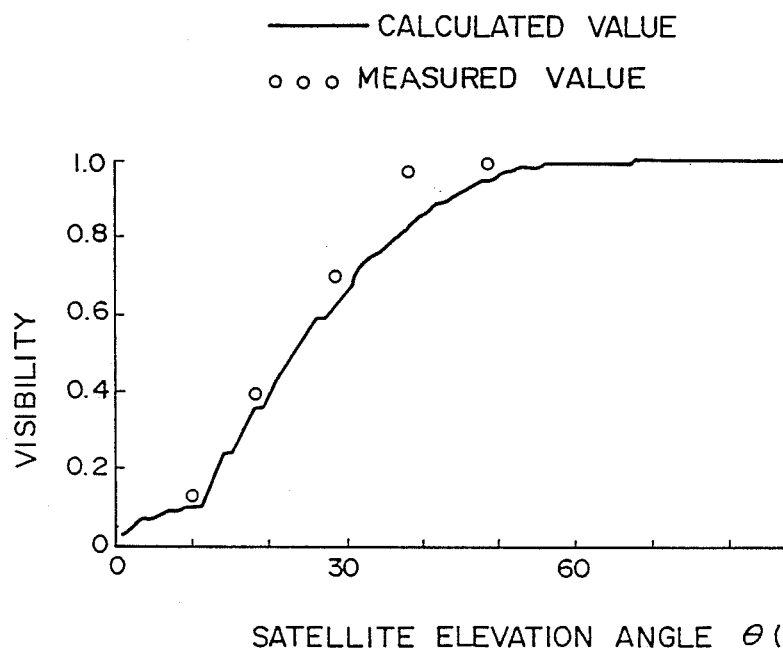
FIG. 4 is a graph plotting computed and experimental results which show the relationship between the elevation angle $\theta$ for the satellite and the satellite visibility under a particular condition.

FIG. 4 shows the measured visibility versus the satellite elevation angle $\theta$ on the Sakura street in the Nagoya City, as compared with the calculated one with the calculation process mentioned before. Satisfying coincidence can be seen between the measured and calculated results. It is believed that the aforementioned process can be sufficiently used to estimate the visibility.

In such a manner, it is possible to estimate the visibility of each satellite at an area in which the vehicle is running and also to select a combination of satellites by higher visibilities at that area.

The operation of the navigation system according to the first embodiment of the present invention will be described with respect to two-dimensional measurement.

Referring to FIG. 1, there is shown the first embodiment of a land vehicle navigation system constructed according to the principle of the present invention, which comprises a heading detector 2 in response to the output of an azimuth sensor 1 for sensing the heading of a vehicle. The output of the heading detector 2 is connected with the input of the visibility computing section 11.

The land vehicle navigation system further comprises a keyboard 4 for manually providing date, initial position and other factors, this section 4 being connected to the input of satellite position computing section 3.

The satellite position computing section 3 is adapted to compute the number and position of satellites which are stayed above the horizon, based on date and initial position inputted from the keyboard 4 and also on almanac data supplied from the demodulating and pseudo-range computing section 9.

In such an arrangement, a geographical information section 5 previously stores the map indicative of a road on which the vehicle is to run, building located along the road, place name and others and the distribution of building height in the area in which the vehicle is to travel. The distribution of building height is characterized by the average and minimum heights ($\overline{H}$, Hmin) of all the buildings in each of cells.

Figure 5:
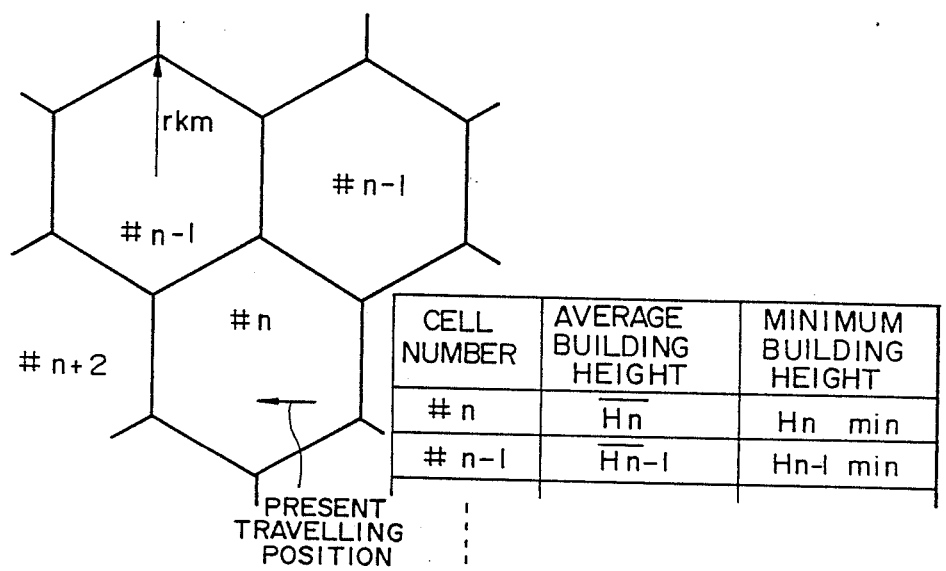
FIG. 5 shows data with respect to the distribution of building height for each cell in the geographical information section according to the present invention.

FIG. 5 exemplifies data relating to the average and minimum heights ($\overline{H}$, Hmin) of buildings. These data are stored relating to numbered honeycomb-like cells with r kilometers in radius.

The section for reading out the average and minimum heights of buildings for the presently located cell (hereinafter referred to "reader 6" simply) is adapted to determine, from the geographical information section 5, what cell the vehicle is presently travelling at, based on positional data determined by present position computing section 10. The reader 6 also reads the average and minimum heights relating to that cell, which data in turn are provided to the visibility computing section 11.

A receiver section 8 comprises a circuit for amplifying the signal received by an antenna 7 on the vehicle and a circuit for demodulating the signal by multiplying it by desired PN code produced at a PN code generator 14 to obtain the data sending from the satellites.

The demodulating and pseudo-range computing section 9 is adapted to obtain various data from the satellites by modulating signals received at the receiver section 8 and at the same time to calculate the pseudo-range by measuring the signal transmission time from the satellite to the vehicle.

Present-position computing section 10 determines the present position of the vehicle from the aforementioned navigation equation, based on the output of the demodulating and pseudo-range computing section 9.

The visibility computing section 11 calculates the visibility P for each of the satellites using the aforementioned equation (4) from the value $\phi_0$ determined from the heading of the vehicle and the azimuth angle for that satellite; the average and minimum heights of buildings ($\overline{H}$, Hmin) at the present cell determined from the reader 6; the antenna height (h); the distance between the building and the vehicle (D); the elevation angle for that satellite from the satellite position computing section 3 and so on. The visibility computing section 11 further determines all the possible combinations of three satellites above the horizon and then computes a probability that three satellites are simultaneously visible, that is, a product of the visibilities (visibility product) for three satellites.

PDOP computing section 12 is adapted to calculate the value of PDOP for each of all the possible combinations of three satellites in accordance with the data from the satellite position computing section 3.

Satellite selecting section 13 compares PDOP values for each of the combinations of satellites provided from the PDOP computing section 12 with a reference value $L_0$ which has been determined previously, and then selects the combination of satellites providing the maximum visibility product from the combinations of satellites which provides a PDOP value less than the reference value $L_0$.

The PN code generator 14 is adapted to generate a PN code corresponding to each of the satellites in the combination selected by the satellite selecting section 13 and to send the code stream to the receiver section 8.

The map and present-position display section 15 is adapted to display data representative of the present position of the vehicle from the present-position computing section 10 and data indicative of the map from the geographical information section 5. Further, the map and present position display section 15 also indicates the absence of any satellite required to determine the position of the vehicle.

The two-dimensional measurement of position for a moving vehicle will now be described with reference to the land vehicle navigation system in the first embodiment of the present invention.

FIG. 5 exemplifies how to divide the map into many cells for which the average building height $\overline{H}$ and the minimum building height Hmin should be recorded. The map is divided into honeycomb-like cells encircled by a circle having its radius r.

Figure 6:
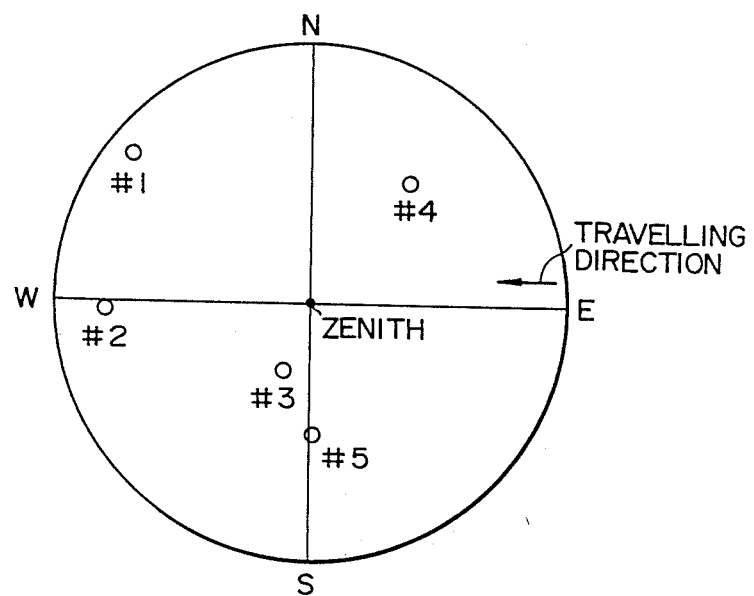
FIG. 6 shows a constellation of satellites relating to the position of a vehicle.

FIG. 6 shows an arrangement of five satellites above the horizon at a certain time, centering a vehicle which is running to the west. Table 1 shows an elevation angle $\theta$ for each of the five satellites and an azimuth angle $100_0$ for each of the satellites from the travelling direction of the vehicle.

TABLE 1

| Satellite | Elevation $\theta$ (degrees) | Azimuth $\phi$ (degrees)$^0$ |
|---|---|---|
| #1 | 10 | 140 |
| #2 | 20 | 182 |
| #3 | 65 | 250 |
| #4 | 35 | 52 |
| #5 | 47 | 272 |

Figures 7, 7A, 7B:
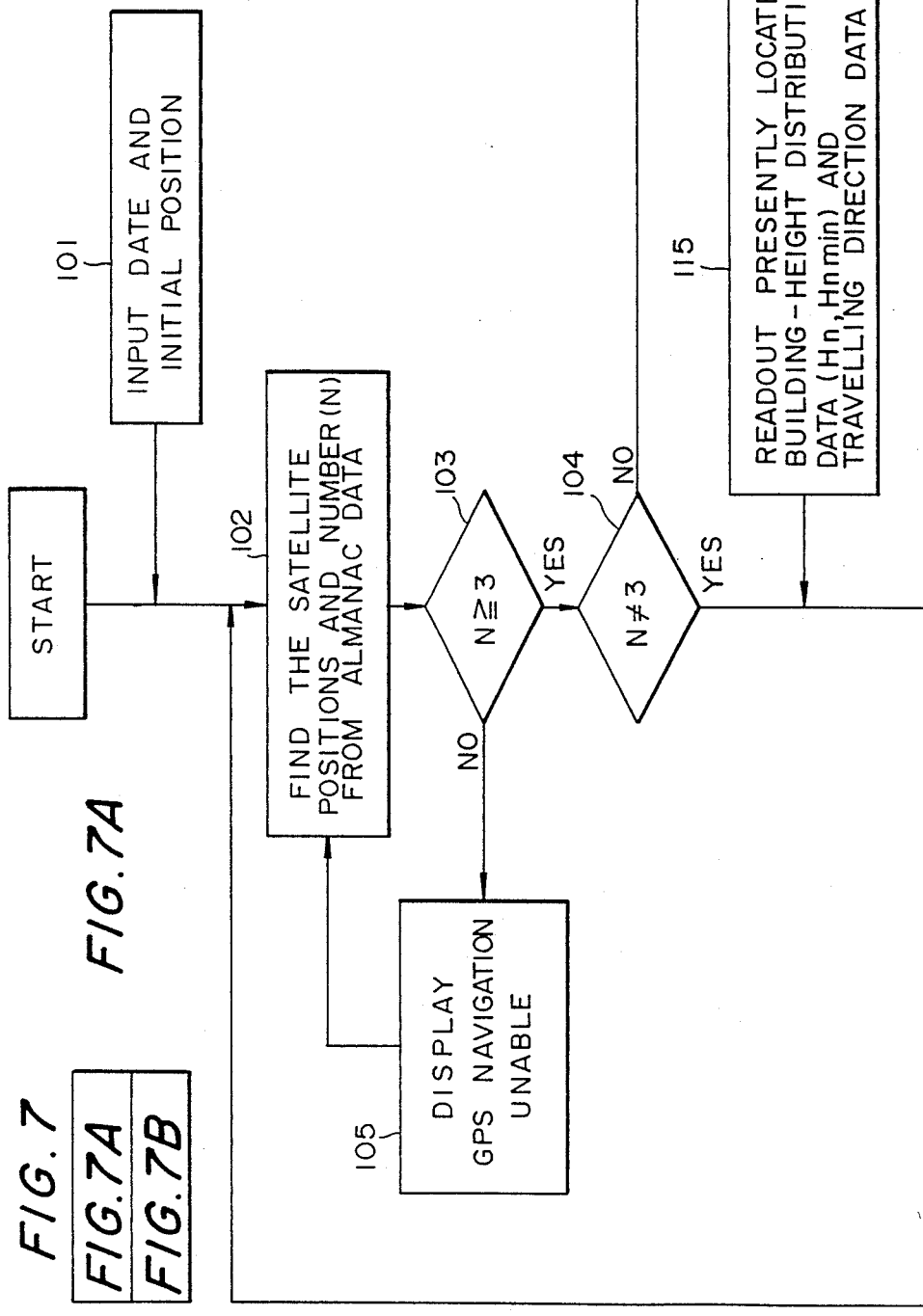
FIGS. 7A and 7B are flow charts illustrating the operation of the first embodiment of the present invention.
Figure 7B:
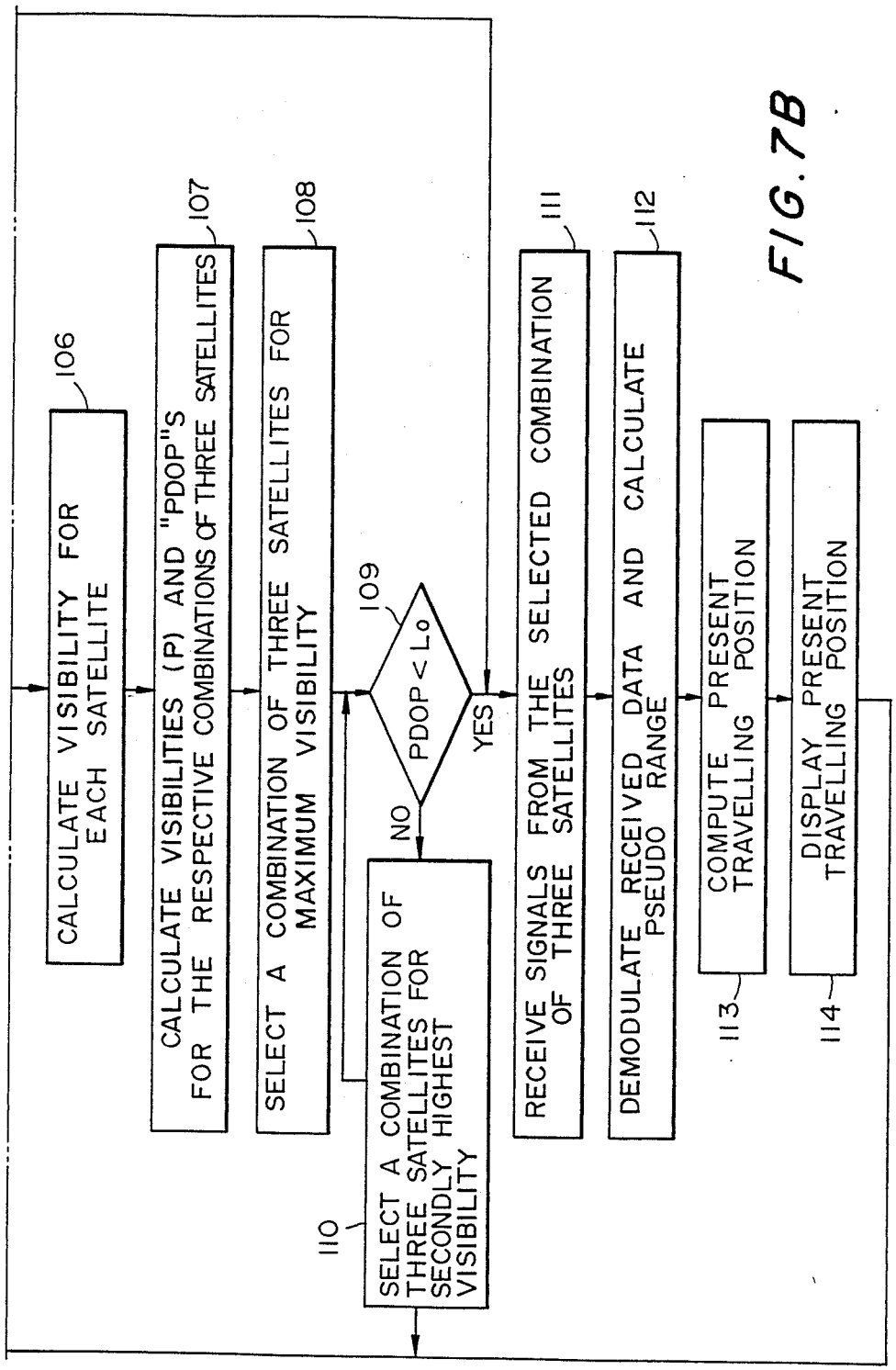

The operation will be described with reference to FIG. 7 which shows a flow chart.

At step 101, the date and initial position of a vehicle are first inputted through the keyboard 4. At step 102, positions and number (N) of satellites which are presently above the horizon is determined at the satellite position computing section 3, based on almanac data from the pseudo-range computing section 9 in addition to the date and initial position from the keyboard 4. In this instance, it is assumed that the number and positions of satellites are equal to those shown in Table 1. At step 103, there is then checked whether or not the number N is equal to or greater than three, that is, $N \geq 3$. If $N \geq 3$, it is checked whether or not $N=3$, that is, the number N is equal to or greater than three (step 104). If $N < 3$, the fact that the navigation using the GPS cannot be carried out will be displayed. Then, the steps 102, 103 and 104 will be repeated until the number N becomes equal to or greater than three. If the number N is equal to three, there is only one combination. The signals from these satellites will be received by the receiver section 8. If the number N is greater than three, the visibility for each of the satellites is calculated (step 106). In other words, the data ($\overline{H}n$, Hnmin) relative to the cell in which the vehicle is presently travelling from the reader 6 are inputted in the visibility computing section 11 together with data indicative of the heading of the vehicle from the travelling direction detector 2 (step 115). And then, the visibility for each of the satellites is computed by the use of the aforementioned equation (4) (step 106).

Further, the probability that the three satellites are simultaneously visible for all the possible combinations of three satellites selected from the five satellites shown in FIG. 6, that is, a product of the visibilities for the respective satellites which have been selected previously is computed at the visibility computing section 11 and at the same time PDOP values for all the combinations of satellites are calculated at the PDOP computing section 12 (step 107).

TABLE 2

| Combination of Satellites | PDOP | Visibility Product |
|---|---|---|
| #1, 4 and 5 | 1 | 0.08 |
| #2, 4 and 5 | 2 | 0.26 |
| #2, 3 and 5 | 9 | 0.26 |

Table 2 exemplifies visibility products calculated for some combinations of satellites for which the PDOP values become less than 10, based on the distribution of building height at the Sakae area in Nagoya, Japan.

The satellite selecting section 13 selects the combination of satellites having the maximum visibility product from the combinations of satellites providing PDOP value less than a reference value $L_0$ determined previously. Namely, the combination of three satellites providing the maximum visibility product is determined (step 108). It is then checked whether or not the PDOP value is less than the reference value $L_0$ (step 109). If the PDOP value is not less than the reference value, there is then determined the combination or three satellites providing the next higher visibility product (step 110). If there is no combination of satellites to be selected, the program will return to step 102. If the PDOP value is less than the reference value $L_0$, the above combination of three satellites providing the maximum visibility product is selected from all the combinations of three satellites having their PDOP values less than the reference value $L_0$. Thus, the three satellites in the above combination will be specified to be used on user position fixing. For example, if the results shown in Table 2 ($L_0 = 10$) are utilized, three satellites numbered by #2, #4 and #5 will be selected. If there is the same visibility product, a combination of satellites providing a lower PDOP value will preferentially be selected.

For each of the three satellites in the specified combination, the PN code generator 14 generates the PN code stream which is used to demodulate the signal from each satellite at the receiver section 8 (step 111).

Subsequently, data from the satellites are obtained and a pseudo-range from the vehicle to each of the satellites is determined, at the demodulating and pseudo-range computing section 9 (step 112).

Based on such obtained data and such determined pseudo-ranges, the present-position computing section 10 computes the present position of the vehicle by the use of the generally known navigation equation (step 114). The results therefrom are displayed on the map and position displaying section 15 (step 114).

As will be apparent from the foregoing, the first embodiment of the present invention comprises the geographical information section 5 which has stored the average and minimum heights of building in each of the cells. At the visibility computing section 11, the visibility of the satellite having its elevation $\theta$ and azimuth $\phi_0$ is then calculated using the equation (4), based on the distribution of building height in the cell wherein the vehicle is presently running, which has been stored in the geographical information section 5. These results also are used to select the optimum combination of satellites. Therefore, in urban area the GPS can be utilized more frequently.

Although the first embodiment of the present invention has been described as to the two-dimensional position fixing, three-dimensional measurement of position can be carried out in the same manner by utilizing four satellites.

Figure 8B:
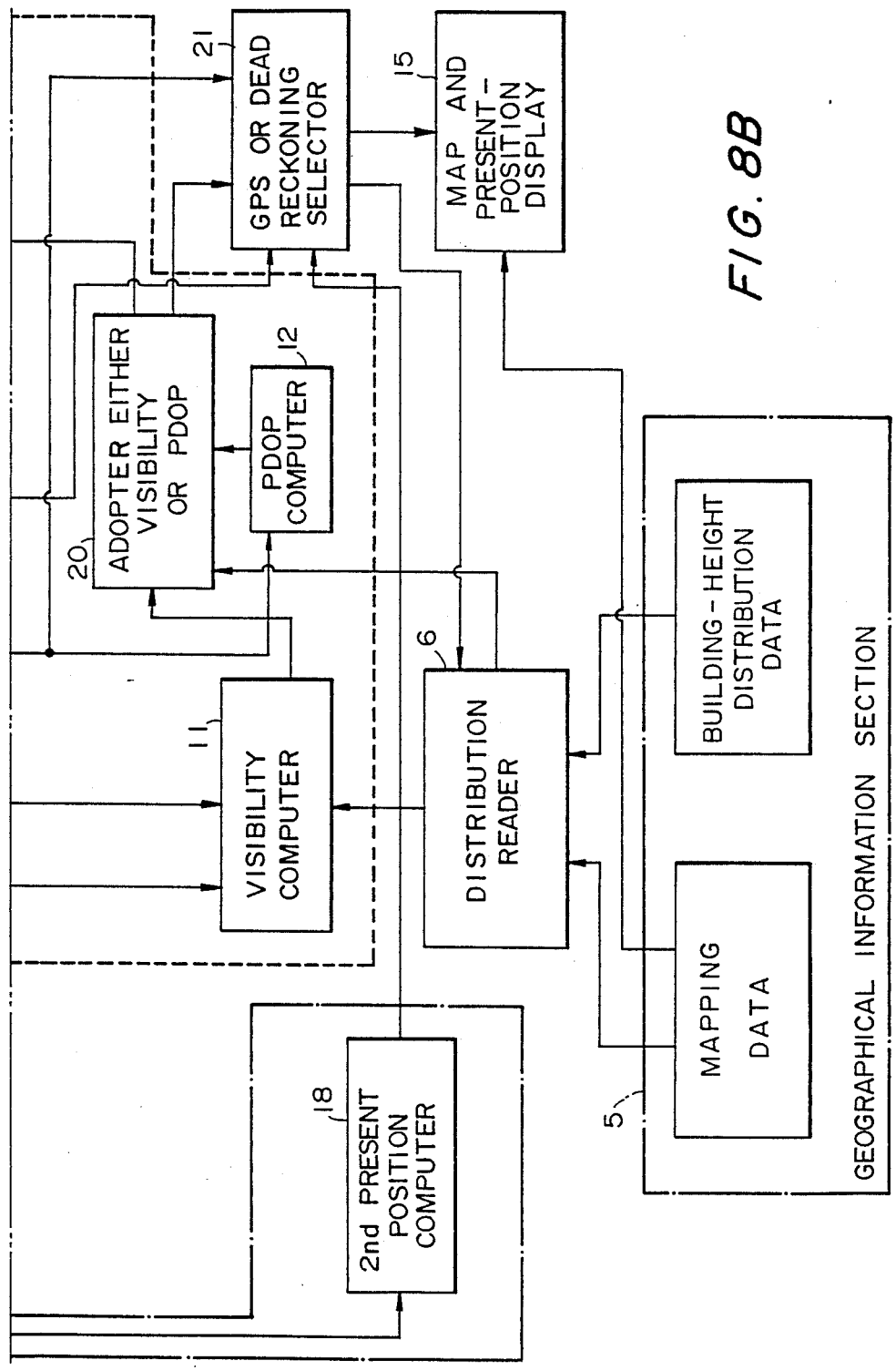

FIG. 8 shows the second embodiment of a land vehicle navigation system constructed according to the present invention. The second embodiment is adapted not to select a combination of satellites providing the maximum visibility product, but to judge whether either of the visibility product or PDOP should be preferentially selected at the present time based on the average building height ($\overline{H}$). If the position fixing using the GPS cannot be properly carried out, the present position can be successively fixed using the dead reckoning system with a distance sensor and an azimuth sensor. Even if the satellites cannot be utilized by the user, the vehicle navigation system can continue the measurement. In FIG. 8, the same components as those of the first embodiment are designated by the same reference numerals.

In addition to the arrangement of the first embodiment, the land vehicle navigation system of the second embodiment comprises the position fixing department using the dead reckoning system consisting of a distance interval pulse generator 16, a locus computing section 17 and a present 2nd position computing section 18; an adopter for adopting either visibility or PDOP 20 and the GPS or the dead reckoning system selector 21.

The distance interval pulse generator 16 is adapted to measure the travelling distance of the vehicle through a sensor which is mounted on a wheel of the vehicle.

The locus computing section 17 is adapted to determine the travelling locus of the vehicle, using signals for the travelling distance from the distance interval pulse generator 16 and signals for the vehicle heading from the travelling direction detector 2. An initial position inputted through the keyboard 4 is first used as an original value which is indicative of the origin of the travelling locus. If the position fixing using the GPS becomes to operate properly, the result from the 1st present position computing section 10 is sequentially read by the locus computing section 17 so that the origin of the locus at that time will be determined.

The 2nd present position computing section 8 determines the present position of the moving vehicle using signals from the locus computing section 17.

The position fixing department using the dead reckoning system 19 itself, including the aforementioned sections 16, 17 and 18, is well-known in the field of navigation and will not be described in detail.

The adopter 20 compares the data of the average building height (H) around the present position, provided from the reader 6 with a predetermined reference value $H_0$ (which is preferably ranged between five meters and eight meters) and then determines the preferential order of the PDOP or the visibility, depending on the above comparison. The value of PDOP is lower as satellites are more broadly constellated above the horizon. As the value of PDOP is lower, the navigation accuracy is higher. In the case of the combination of satellites with low PDOP value, some satellites are in the position near the horizon. If the average building height around an area in which the vehicle is travelling is relatively high, the selection of satellites preferentially due to PDOP will make the reception of the signal from the satellite substantially impossible. In such a situation, it is preferred to make the preferential selection of satellites to be higher visibilities.

The GPS or the dead reckoning system selector 21 stores separately the data indicative of the present position determined using the GPS and dead reckoning system. These data are refreshed in the selector 21 with the last data from the present position computing sections 10 and 18, respectively. When the present position can not be accurately fixed using the GPS, that is, when the number of satellites above the horizon is insufficient to perform the position fixing or when the value of PDOP is greater than the reference value $L_0$ and also when the visibility product is less than the reference value $P_0$, the present position is fixed using the dead reckoning system. In the other cases, the data indicative of the present position obtained using the GPS is provided to both the map and present position display section 15 and the reader 6 at all times.

Figure 9C:
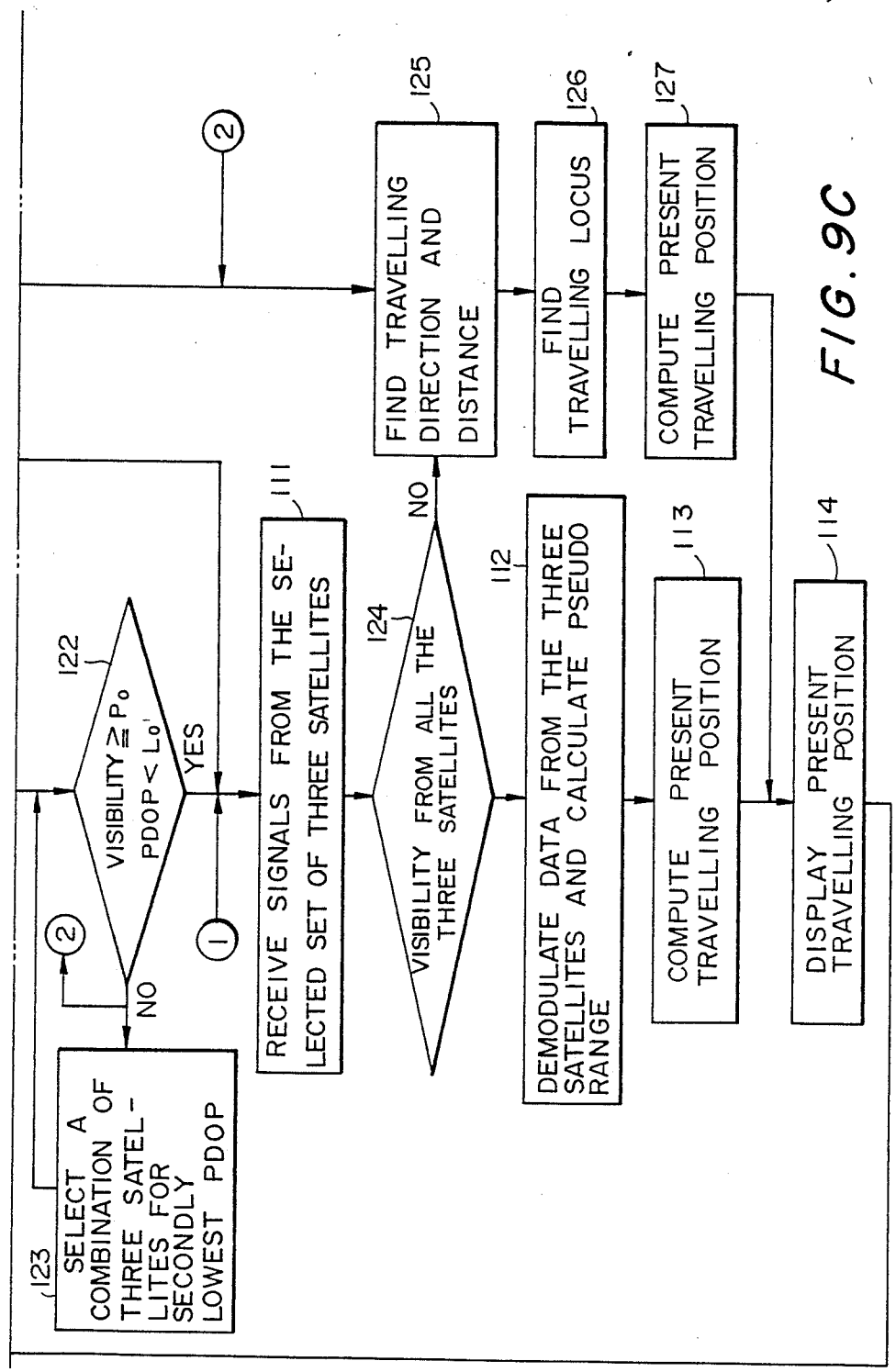

The operation of the second embodiment will be described below in connection with a flow chart shown in FIG. 9.

As in the first embodiment, at the position fixing department using the GPS navigation section 22, the visibility and PDOP for each of the satellites are computed responding to the input from the keyboard 4. If the number of satellites is less than the necessary number to compute the present position of the vehicle (three satellites in the two-dimensional position fixing), the position fixing department using the dead reckoning system 19 will be used to determine the present position of the vehicle (step 114).

At the position fixing department using the dead reckoning system 19, the travelling distance of the vehicle is determined based on the output of the distance interval pulse generator 16 and the heading of the vehicle is also determined based on the outputs of the azimuth sensor 1 and travelling direction detector 2 (step 125).

Such detected travelling distance and heading of the vehicle are used to compute the travelling locus at the locus computing section 17 (step 126).

The present position computing section 18 determines the present position based on the travelling locus from the locus computing section 17 (step 127).

The average building height ($\overline{H}n$) in the present area stored in the geographical information section 5 is then compared with the reference value $H_0$ which is preferably ranged from five meters to eight meters (step 120).

If $\overline{H}n$ is less than $H_0$, it is judged that the average satellite visibility is relatively high. The system preferentially selects a combination of satellites providing the minimum PDOP (step 121). Such a combination of satellites is checked with respect to its visibility product and PDOP. The above check is done on the condition that the visibility product is equal to or greater than $P_0$ and the PDOP is less than $L_0$ (step 122). If not so, there will be selected a combination of satellites providing the next lower PDOP (step 123). It is again judged whether or not such a combination of satellites meets the above condition. Such a cycle is repeated to determine the optimum combination of satellites from which the signals are desirably received (step 111).

If the aforementioned condition ($P \geq P_0$ and also $PDOP < L_0$) is not fulfilled, the results from the position fixing department using the dead reckoning system 19 are displayed at the present position of the vehicle until the vehicle reaches an area fulfilling the above condition.

The receiver section 8 independently receives the signals from the three satellites. If it becomes possible to demodulate the signals and to measure pseudo-ranges for all the three satellites, the present position computing section 10 calculates the present position of the vehicle, which is displayed on the map and present position display section 15 (steps 113 and 114).

If H is equal to or greater than $H_0$, it is then judges that the visibility in that area is relatively small. The combination of satellites providing the maximum visibility product will preferentially be selected (step 108). It is however judged that the determined combination satisfies such a condition that the PDOP is less than $L_0$ and also the visibility product is equal to or greater than $P_0$ as in the previous case ($\overline{H} < H_0$) (step 109). If do so, the signals from the satellites will be received to fix the present position using the GPS (step 111). If not so, the position fixing using the leak reckoning system will be carried out (steps 125 and 126).

In addition to the aforementioned operation, the locus computing section 17 stores the travelling locus of the vehicle in parallel manner at all times. Immediately when program is switched to the position fixing using the leak reckoning system, the locus computing section 17 provides data of the present position to the map and present position display section 15 through the position computing section 18. The data can be utilized, for example, to determine the distribution of building height around the present area and to calculate the visibility, such that a timing at which the program is next switched to the GPS navigation mode can be determined.

Where the position fixing is carried out using the GPS, the resulting data is always used to update the present position data stored in the position fixing department using the dead reckoning system 19. This can decrease the integrated error which is a defect in the dead reckoning system.

In addition to the features of the first embodiment, the second embodiment comprises the position fixing department using the dead reckoning system 19 by which present position can be successively fixed, when the position fixing using the GPS is improper in operation, that is, when the number of satellites above the horizon is smaller than the necessary number for position fixing, when the PDOP is greater than the reference value $L_0$ or when the visibility product is less than the reference value $P_0$. Therefore, the land vehicle navigation system according to the second embodiment of the present invention may be utilized over a widening range of areas.

As will be apparent from the foregoing, the land vehicle navigation system of the present invention can select the optimum combination of satellites providing the maximum visibility product at the desired area in which the vehicle is to run, based on the distribution of building height in that area, the position of satellites and the direction of movement. As a result, high navigation accuracy can be obtained.

We claim:

1. A land vehicle navigation system comprising:
a global positioning system (GPS) for receiving and demodulating signals from a plurality of satellites to fixedly determine the present travelling position of a vehicle;
a satellite position computing means for determining the position of each of said satellites, based on almanac data supplied from said global positioning system;
a heading detector for continuously detecting the heading of said vehicle;
a geographical information means for storing a map indicated on an area in which the vehicle is to run and data representative of the distribution of the building height at said area;
a visibility computing means for determining the visibility for signals from each of the satellites, based on signals indicative of the position of each satellite from said satellite position computing means, data representative of the heading of the vehicle from said heading detector and data indicative of the distribution of the building height from said geographical information means;
a satellite selecting means for selecting a combination of satellites providing the maximum visibility at said area, based on signals indicative of the visibility from said visibility computing means; and
a map and present position displaying means for displaying data representative of the map from said geographical information means and the present position of the vehicle,
whereby a combination of satellites providing the maximum visibility for signals to be received by said global positioning system can be selected depending on the distribution of the building height in the area in which the vehicle is running.

2. A land vehicle navigation system as defined in claim 1 wherein said geographical information means stores the average and minimum building height in each of given cell area so that a distribution of building height can be determined for each cell area.

3. A land vehicle navigation system as defined in claim 1 or 2 wherein said visibility computing means determines the visibility using the following equation:

$$P = 1 - exp\{-(h + D \tan\theta/\sin\phi_0 - Hmin)/(H - Hmin)\}$$

where P is the visibility; $\overline{H}$ is the average building height; Hmin is the minimum building height; h is the antenna height; D is the lateral distance from a building to a vehicle; $\theta$ is an elevation angle for a satellite; and $\phi_0$ is an azimuth angle for the satellite in the vehicle travelling direction.

4. A land vehicle navigation system as defined in claim 1 or 2, further comprising user control means for manually inputting the initial position of a moving vehicle to the system.

5. A land vehicle navigation system as defined in claim 1 or 2, further comprising means in response to a signal indicative of the present position from said global positioning system for deciding the distribution of the building height in the present area and for reading data representative of a map and building height distribution from said geographical information means as the optimum data for the present position of the vehicle, said data being then provided to said visibility computing means.

6. A land vehicle navigation system as defined in claim 1 or 2, further comprising an azimuth sensor in the vehicle for detecting the heading, the output of said azimuth sensor being supplied to said heading detector.

7. A land vehicle navigation system as defined in claim 1 or 2 wherein said global positioning system (GPS) comprises:
- antenna means on the vehicle for receiving signals from a plurality of satellites;
- a PN code generator for generating a PN code inherent in a satellite to be selected;
- a receiver means for amplifying the signal received by said antenna means;
- a demodulating and pseudo-range computing means for demodulating signals amplified by said receiver means with said PN code from said PN code generator and for determining a pseudo-range between each of said satellites and the vehicle, based on data from that satellite; and
- a present position computing means for computing the present position of the vehicle from the output of said pseudo-range computing means.

8. A land vehicle navigation system comprising:
- a global positioning system (GPS) for receiving and demodulating signals from a plurality of satellites to fixedly determine the present travelling position of a vehicle;
- a satellite position computing means for determining the position of each of said satellites, based on almanac data supplied from said global positioning system;
- a heading detector for continuously detecting the heading of said vehicle;
- a geographical information means for storing a map indicative of an area in which the vehicle is to run and data representative of the distribution of the building height at said area;
- a visibility computing means for determining the visibility for signals from each of the satellites, based on signals indicative of the position of each satellite from said satellite position computing means, data representative of the heading of the vehicle from said heading detector and data indicative of the distribution of the building height from said geographical information means;
- a PDOP (HDOP) computing means in response to signals indicative of the positions of the satellites from said satellite position computing means and for computing PDOP representative of radial range error with respect to the three-dimensional coordinates determined from a combination of satellites or HDOP representative of radial range error in the two-dimensional coordinates;
- a satellite selecting means for determining a combination of satellites providing the minimum PDOP (or HDOP) from data obtained from said geographical information means and representative of the average building height in an area in which the vehicle is presently travelling, for determining a combination of satellites providing the maximum visibility in said area from signals indicative of the visibility form said visibility computing means and for selecting said two combinations in accordance with a given basis; and
- a map and present position displaying means for displaying map data from said geographical information means and data indicative of the present position of the vehicle from said global positioning system;
- whereby a combination of satellites providing signals to be received by said global positioning system can be selected on the basis of both the PDOP (or HDOP) and visibility data, depending on the distribution of the building height in the area in which the vehicle is running.

9. A land vehicle navigation system as defined in claim 8 wherein said geographical information means stores the average and minimum building height in each of given cell areas so that a distribution of building height can be determined for each cell area.

10. A land vehicle navigation system as defined in claim 8 or 9 wherein said visibility computing means determines the visibility using the following equation:

$$P = 1 - exp\{-(h+D\tan\theta/\sin\phi_0 - Hmin)/(H - Hmin)\}$$

where P is the visibility; $\overline{H}$ is the average building height; Hmin is the minimum building height; h is the antenna height; D is the lateral distance from a building to a vehicle; $\theta$ is an elevation angle for a satellite; and $\phi_0$ is an azimuth angle for the satellite in the vehicle travelling direction.

11. A land vehicle navigation system as defined in claim 8 or 9, further comprising means in response to a signal indicative of the present position from said global positioning system for deciding the distribution of the building height in the present area and for reading data representative of a map and building height distribution from said geographical information means as the optimum data for the present position of the vehicle, said data being then provided to said visibility computing means.

12. A land vehicle navigation system as defined in claim 8 or 9 wherein said global positioning system (GPS) comprises:
- antenna means on the vehicle for receiving signals from a plurality of satellites;
- a PN code generator for generating a PN code inherent in a satellite to be selected;
- a receiver means for amplifying the signal received by said antenna means;
- a demodulating and pseudo-range computing means for demodulating signals amplified by said receiver means with said PN code from said PN code generator and for determining a pseudo-range between each of said satellites and the vehicle, based on data from that satellite; and
- a present position computing means for computing the present position of the vehicle from the output of said pseudo-range computing means.

13. A land vehicle navigation system comprising:
- a geographical information means for storing a map indicative of an area in which the vehicle is to run and data representative of the distribution of the building height in said area;
- a heading detector for continuously detecting the heading of a vehicle;
- a global positioning system (GPS) navigation means comprising a global positioning system (GPS) for receiving and demodulating signals from a plurality of satellites to perform a computation of positional measurement for determining the present position of said vehicle, a satellite position computing means for determining the position of each of said satellites from almanac data obtained through said global positioning system, visibility computing means for determining the visibility for signals from each of said satellites, based on signals indicative of the position of the satellite from said satellite position computing means and data representative of the heading of said vehicle movement from the heading detector and data indicative of the distribution of the building height from said geographical information means, and satellite selecting means for selecting a combination of satellites providing the maximum visibility in the area, based on signals representative of the visibility from said visibility computing means;

a dead reckoning system for computing actual travelling locus of the vehicle to determine the present position of the vehicle;

a GPS or dead reckoning selector for storing the respective present positions of the vehicle obtained by said GPS navigation means and dead reckoning system and for outputting data indicative of the vehicle position under the optimum condition; and a map and present position displaying means for displaying map data from said geographical information means and the present position of the vehicle from said GPS or dead reckoning selector, whereby the optimum one of the positional data obtained by both the GPS navigation means and dead reckoning system can be selected and, when it is wanted to obtain positional data from said GPS navigation means, a combination of satellites providing the maximum visibility can be selected in consideration with the visibility.

14. A land vehicle navigation system as defined in claim 13 wherein said dead reckoning system comprises a distance interval pulse generator for determining the distance of movement of the vehicle, a locus computing means for determining the travelling locus of the vehicle from signals indicative of the distance of movement from said distance interval pulse generator and signals representative of the heading of the vehicle from the heading detector, and a dead reckoning position computing means for determining the present position of the moving vehicle based on signals representative of the trace of movement of the vehicle from said travelling locus computing means.

15. A land vehicle navigation system as defined in claim 14 wherein said geographical information means stores the average and minimum building heights in each of given cell areas so that a distribution of building height can be determined for each cell area.

16. A land vehicle navigation system as defined in claim 14 wherein said visibility computing means determines the visibility using the following equation:

$$P = 1 - exp\{-(h + D\tan\theta/\sin\phi_0 - Hmin)/(-Hmin)\}$$

where P is the visibility; $\overline{H}$ is the average building height; Hxin is the minimum building height; h is the antenna height; D is the lateral distance from a building to a vehicle; $\theta$ is an elevation angle for a satellite; and $\phi_0$ is an azimuth angle for the satellite in the travelling direction.

17. A land vehicle navigation system as defined in any one of claims 13, 14, 15 and 16 wherein the present position determined by said dead reckoning system is corrected by the present position obtained by said GPS navigation means.

18. A land vehicle navigation system as defined in claim 13 or 14, further comprising means in response to a signal indicative of the present position from said global positioning system for deciding the distribution of the building height in the present area and for reading data representative of a map and building height distribution from said geographical information means as the optimum data for the present position of the vehicle, said data being then provided to said visibility computing means.

19. A land vehicle navigation system as defined in claim 13 or 14 wherein said global positioning system (GPS) comprises:

antenna means on the vehicle for receiving signals from a plurality of satellites;

a PN code generator for generating a PN code inherent in a satellite to be selected;

a receiver means for amplifying the signal received by said antenna means;

a demodulating and pseudo-range computing means for demodulating signals amplified by said receiver means with said PN code from said PN code generator and for determining a pseudo-range between each of said satellites and the vehicle, based on data from that satellite; and a GPS present position computing means for computing the present position of the vehicle from the output of said pseudo-range computing means.

* * * * *